Aug. 26, 1958  R. E. PETRICK ET AL  2,849,204
LOCKING MEANS FOR A STAND
Original Filed July 21, 1950
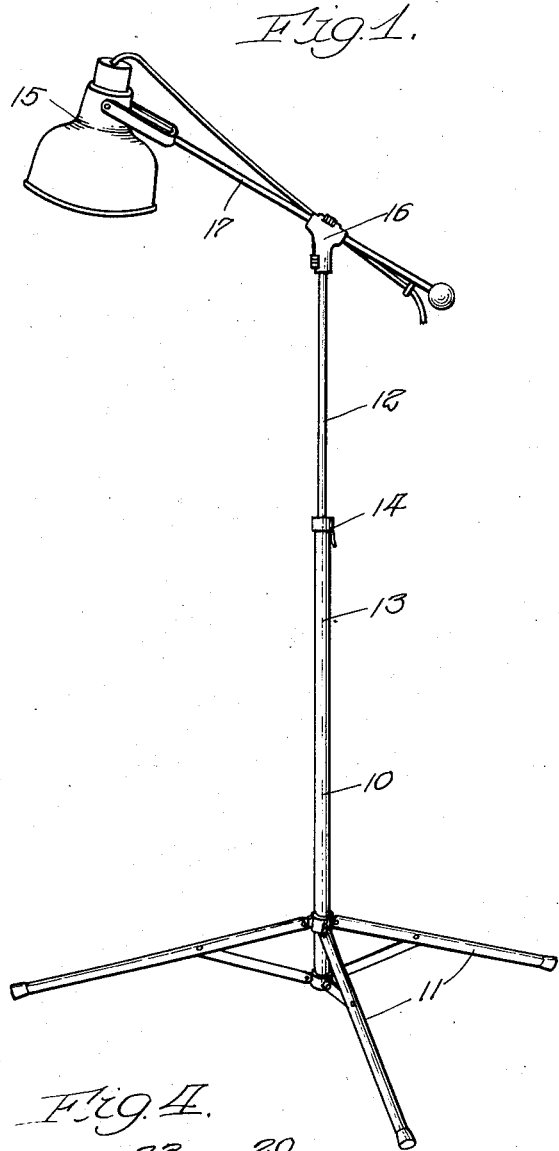
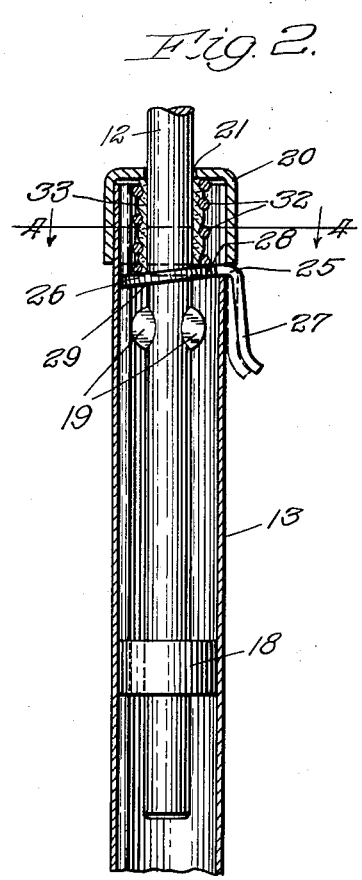
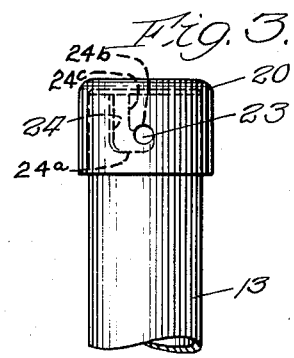
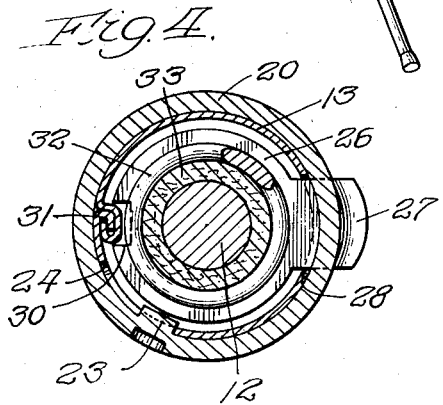
Inventors:
Edward J. Petrick,
Russell E. Petrick,
By Schrader, Merriam,
Hofgren & Brady,
Attys.

United States Patent Office 2,849,204
Patented Aug. 26, 1958

2,849,204

LOCKING MEANS FOR A STAND

Russell E. Petrick and Edward J. Petrick, Park Ridge, Ill., assignors to Bretford Manufacturing, Inc., Franklin Park, Ill., a corporation of Illinois Original application July 21, 1950, Serial No. 175,164, now Patent No. 2,703,690, dated March 8, 1955. Divided and this application June 22, 1953, Serial No. 363,124

3 Claims. (Cl. 248—161)

This invention relates to supporting stands for lamps and the like, and more particularly to a means for locking a telescoping stand in varying degrees of extended position. This is a divisional application of our copending application, Serial No. 175,164, entitled "Lamp Stand," and filed July 21, 1950, now Patent 2,703,690.

The primary object of this invention is to provide a simple and effective means for gripping and retaining a telescoping stand in any desired position of extension.

Another object is to provide a locking means for a stand having a spring associated therewith for normally urging the locking means into gripping engagement with an extensible member in the stand.

A further object is to provide a spring for a locking means which assists in centering a telescoping member in the stand and releasably secures a cap for the locking means in its bayonet slot.

Another object is to provide a friction means for a telescoping stand which will restrain a telescoping member from dropping downwardly when the locking means is released.

A further object is to provide a locking means for a stand which can be quickly and easily assembled or dismantled.

Still another object is to provide a locking means which can be cheaply and easily manufactured.

The invention is illustrated in the preferred embodiment in the accompanying drawings, in which:

Fig. 1 is a perspective view of the supporting stand shown in use with a lamp;

Fig. 2 is a sectional view through the locking means of the supporting stand;

Fig. 3 is a side view of the cap shown in Fig. 2; and

Fig. 4 is a sectional view of Fig. 2 taken along line 4—4 as indicated.

In the embodiment illustrated, a supporting stand generally designated 10 has a tripod base 11 of conventional construction and an extensible rod 12 capable of telescoping within the tubular supporting standard or member 13. The locking means 14 is normally in gripping engagement with the extensible rod to hold the rod in varying degrees of extended position. As shown in Fig. 1, the stand is serving as a support for a lamp 15 which engages the extensible rod through a connector 16 and the lamp rod 17. The lamp is for illustrative purposes only, and forms no part of the present invention. It is obvious that the stand could likewise be employed with music racks, movie screens or the like.

As best shown in Fig. 2, the extensible rod is telescoped within the tubular supporting member, there being secured adjacent the end of the rod a piston-like washer 18 which is preferably made of some resilient material such as rubber or plastic. The washer engages the inner surfaces of the tubular supporting member and centers the lower portion of the rod in this member. The washer may be notched (not shown) to fit the inturned crimp 31. When this is done, the crimp 31 serves as a guide to prevent rotation of the extensible rod about its longitudinal axis.

The ear-like projections 19 on the rod prevent it from being removed from the tubular supporting member while the stand is in operation.

As best shown in Fig. 3, the upper end of the tubular supporting member is preferably covered by a cap 20 which has a centrally disposed opening 21 through its top to slidingly receive the extensible rod. The cap is provided with a lug 23 which is adapted to fit into a bayonet slot 24 provided in the end of the tubular supporting member. The bayonet slot extends laterally of the supporting member as at 24a and has an upwardly extending seat 24b into which the lug 23 may be fitted. A longitudinal slot 24c is provided so that the lug may be moved downwardly toward its locking position in the bayonet slot. Thus when the cap is in proper position and turned, it is firmly held in attached position upon the end of the tubular supporting member by an upwardly bearing compression spring 32, to be discussed later.

As best seen in Fig. 2, locking means is herein positioned near the top of the tubular supporting member. An L-shaped lever 25, sometimes referred to as a "nipping lever," having a clamping member 26 and a finger arm 27 is fulcrumed in the slot 28 in the tubular supporting member. The clamping member 26 has a centrally disposed opening 29 therein through which the extensible rod extends. When the clamping member is normal to the rod, the rod is freely received within the opening. However, when the arm is inclined from the normal into gripping or locking position, the edges about the opening in the clamping member 26 impinge upon the extensible rod and hold it fast until the member is again returned to a substantially normal position. The finger arm 27 is preferably formed integrally with the clamping member 26, and when depressed, it pivots the member 26 about its fulcrum point. In the embodiment illustrated, the clamping member 26 has a notch 30 to accommodate the inturned crimp 31 of the tubular supporting member.

The compression spring 32 is positioned within the tubular supporting member and below the cap so that it embraces the extensible rod. This spring performs at least three distinct functions. First, it urges the clamping member 26 into gripping engagement with the extensible rod. Secondly, it yieldingly bears against the underside of the cap to releasably secure the cap in position in the bayonet slot. And, thirdly, it holds a friction sleeve 33, usually composed of a piece of felt, around the extensible rod to prevent the rod from rapidly falling when the locking means is released.

In operation, the extensible rod is normally held in gripping engagement by the clamping member 26 of the locking means. To extend the stand, it is merely necessary to grasp the extension rod and pull it outwardly against the yielding pressure of the compression spring. This outward pull positions the member 26 substantially normal to the extension rod and allows the rod to move easily therein. The outward movement of the extension rod is limited by the ear-like projections 19 bearing against the underside of the lever 26.

In order to depress the extensible rod, the finger arm 27 is pinched to pivot the clamping member 26 against the pressure of the compression spring to a position substantially normal of the extensible rod so that the rod may be allowed to slide therein. Upon release of the rod from engagement with the member 26, the extension rod is ordinarily lightly restrained by the friction sleeve 33 within the compression spring. Therefore, it is usually necessary to exert a light pressure upon the extension rod to telescope it within the tubular supporting member.

The foregoing detailed description is given for clearness of understanding only and no unnecessary limitations should be understood therefrom, for some modifications will be obvious to those skilled in the art.

We claim:

1. A portable stand, comprising a tubular standard supported in an upright position, an extension rod telescoping into the upper end of said standard, said standard having a longitudinal slot extending downward from its upper end and having a bayonet slot extending laterally from said longitudinal slot and then upwardly to form a seat, a cap on the upper end of said standard perforated to receive and guide said extension rod and having a lug thereon to coact with the seat of said bayonet slot for securing said cap, a nipping lever fulcrumed on said standard on an axis transverse to said extension rod and adapted to hold said extension rod, a helical spring bearing between said cap and said nipping lever to normally tilt said nipping lever downward into holding engagement with said extension rod and to normally urge said cap upward to lock said lug in said bayonet slot seat, and an arm on said lever projecting from said standard for shifting said nipping lever out of its holding engagement with said extension rod.

2. A portable stand comprising: a tubular standard supported in an upright position; an extension rod telescoping into the upper end of said standard, said standard being provided with a longitudinal slot extending downwardly from its upper end and having an upturned portion forming a seat; a cap on the upper end of said standard, said cap being perforated to receive and guide said extension rod and being provided with a lug for coacting with said seat to detachably secure the cap to the tubular standard; a clamping member adapted to hold said extension rod, said clamping member being fulcrumed on said standard on an axis transverse to said extension rod and being provided with an arm projecting from the standard for moving the clamping member out of holding engagement with said extension rod; and a coiled spring bearing between said cap and said clamping member normally to tilt the clamping member downward into holding engagement with said extension rod and normally to urge said cap upward to lock the lug in said seat.

3. A portable stand as specified in claim 2, in which the coiled spring embraces the extension rod, and a pad of fibrous material is positioned within said coiled spring and about the extension rod, said coiled spring maintaining said pad of fibrous material in close frictional engagement with said extension rod so that the extension rod is restrained against downward movement when the clamping member is released from holding engagement.

References Cited in the file of this patent

UNITED STATES PATENTS

| | | |
|---|---|---|
| 179,134 | Rand | June 27, 1876 |
| 1,309,375 | Taylor | July 8, 1919 |
| 1,372,456 | Roetter | Mar. 23, 1921 |
| 1,434,322 | Wigzell | Oct. 31, 1922 |
| 1,456,333 | Nelson | May 22, 1923 |
| 2,051,969 | Shastock | Aug. 25, 1936 |
| 2,337,719 | Hueglin | Dec. 28, 1943 |
| 2,442,779 | Oriold | June 8, 1948 |
| 2,483,395 | Benson | Oct. 4, 1949 |
| 2,588,682 | Wyeth | Mar. 11, 1952 |
| 2,591,686 | Des Mais et al. | Apr. 8, 1952 |